(12) United States Patent
Felse et al.

(10) Patent No.: US 9,361,191 B2
(45) Date of Patent: Jun. 7, 2016

(54) METHODS AND APPARATUS FOR DATA RECOVERY FOLLOWING A SERVICE INTERRUPTION AT A CENTRAL PROCESSING STATION

(71) Applicant: Bank of America Corporation, Charlotte, NC (US)

(72) Inventors: Mark D. Felse, Indian Land, SC (US); John B. Hall, Charlotte, NC (US); Michele N. Hanshew, Smyrna, DE (US); Michael J. Pepe, Jr., Wilmington, DE (US); Kerry Kurt Simpkins, Fort Mill, SC (US)

(73) Assignee: Bank of America Corporation, Charlotte, NC (US)

(*) Notice: Subject to any disclaimer, the term of this patent is extended or adjusted under 35 U.S.C. 154(b) by 170 days.

(21) Appl. No.: 14/471,255

(22) Filed: Aug. 28, 2014

(65) Prior Publication Data
US 2016/0062848 A1    Mar. 3, 2016

(51) Int. Cl.
*G06F 11/14*    (2006.01)
*G06F 17/30*    (2006.01)

(52) U.S. Cl.
CPC ........ *G06F 11/1469* (2013.01); *G06F 11/1451* (2013.01); *G06F 17/30312* (2013.01); *G06F 2201/80* (2013.01); *G06F 2201/84* (2013.01); *G06F 2201/87* (2013.01)

(58) Field of Classification Search
USPC .............................................. 714/4, 4.11, 6.3
See application file for complete search history.

(56) References Cited

U.S. PATENT DOCUMENTS

| 6,163,856 | A  | * | 12/2000 | Dion | G06F 11/2071 709/213 |
| 7,676,692 | B2 | * | 3/2010 | Costlow | G06F 11/1482 709/217 |
| 7,992,034 | B2 | * | 8/2011 | Callaway | G06F 11/1641 714/4.11 |
| 2006/0143497 | A1 | * | 6/2006 | Zohar | G06F 11/2058 714/6.23 |
| 2009/0300409 | A1 | * | 12/2009 | Bates | G06F 11/008 714/5.1 |
| 2012/0011391 | A1 | * | 1/2012 | Callaway | G06F 11/1641 714/4.11 |
| 2013/0173743 | A1 | * | 7/2013 | Grigg | H04W 8/205 709/217 |
| 2014/0061294 | A1 | * | 3/2014 | Kempf | G06Q 10/06 235/375 |

* cited by examiner

*Primary Examiner* — Kamini Patel
(74) *Attorney, Agent, or Firm* — Weiss & Arons LLP; Michael A. Springs, Esq.

(57) ABSTRACT

A method for data processing comprising may include receiving a paper instruction at a CS and stamping the paper instruction with a predetermined batch number at the CS. The method may further include transferring the paper instruction to a data element at the CS and constructing an executable electronic data record. The method may include creating a transaction identification number for the record and appending the transaction identification number to the record. The method may include transmitting the record from the RS to a CPS and receiving the record at the CPS. The method may include storing the transaction identification number and the batch identification number of the record in a CPS-table of records and executing the record at the CPS. The method may include transmitting the executed record from the CPS to a DRS, following a discrete lapse of time from the receipt of the record.

13 Claims, 9 Drawing Sheets

METHODS AND APPARATUS FOR DATA RECOVERY FOLLOWING A SERVICE INTERRUPTION AT A CENTRAL PROCESSING STATION

FIELD OF TECHNOLOGY

This application relates to data recovery. More specifically, this application relates to data recovery following a service interruption at a central processing station.

BACKGROUND OF THE DISCLOSURE

Many entities require data replication. Such replication becomes more difficult as the databases associated with such entities increase in size.

The most basic method of data replication is mirroring data from a central data processing station to a safe site. The safe site preferably preserves data when the service interruptions occur at the central data processing station. Such service interruptions may include power outages associated with natural disasters, failures at the central data processing station or other service interruptions.

The mirroring of data from the central data processing station to the safe site often takes time. When a service interruption occurs at the central data processing station, the lag time between data being received at the central data processing system and the mirroring of the data to the safe site complicates a determination of as to which data was successfully mirrored to the safe site prior to the service interruption. Preferably, all data must be reconstructed to ensure that no data was lost as a result of the service interruption.

It would be desirable to provide an end-to-end architecture and method that allows cataloging of, and recovery of, preferably all data in the system at the time of a service interruption.

SUMMARY OF THE INVENTION

An apparatus for data processing is provided. The apparatus may include a capture site ("CS"). The CS may be configured to receive a paper instruction. The CS may be configured stamp the paper instruction with a predetermined batch identification number. The CS may be configured to transfer the paper instruction to a computer-readable data element. The CS may be configured to construct an executable electronic data record based at least in part on the data element. The CS may be configured to create a transaction identification number for the electronic data record. The CS may append the transaction identification number to the electronic data record. The CS may store the electronic data record. The CS may transmit the electronic data record to a central processing station ("CPS").

The CPS may be configured to receive the electronic data record. The CPS may store the transaction identification number and the batch identification number of the electronic data record in a CPS-table of records. The CPS may execute the electronic data record. The CPS may transmit the executed electronic data record to a disaster recovery station ("DRS") following a discrete lapse of time from the receipt of the electronic data record by the CPS.

The DRS may be configured to receive the executed electronic data record. The DRS may save the electronic data record to a DRS computer readable memory.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

An apparatus for data processing is provided. The apparatus may include a capture site ("CS"), a central processing station ("CPS") and a disaster recovery station ("DRS").

The CS may be configured to receive a paper instruction. The CS may be configured to stamp the paper instruction with a predetermined batch identification number. The CS may be further configured to transfer the paper instruction to a computer-readable data element and construct an executable electronic data record based at least in part on the data element.

The CS may also be configured to create a transaction identification number for the electronic data record. The CS may append the transaction identification number to the electronic data record and then store the electronic data record.

The CS may be further configured to transmit the electronic data record to the CPS.

The CPS may be configured to receive the electronic data record preferably as transmitted by the CS. The CPS may be configured to store the transaction identification number and the batch identification number of the electronic data record in a CPS-table of records. The CPS may also be configured to execute the electronic data record.

The CPS may include a transmitter. The transmitter may be configured to transmit the executed electronic data record to a disaster recovery station ("DRS"). The transmission may occur following a lapse of time from the receipt of the electronic data record by the CPS.

The DRS may be configured to receive the executed electronic data record from the CPS. The DRS may be configured to save the electronic data record to a DRS computer-readable memory.

In certain embodiments, the transmission from the CPS to the DRS does not occur in real time.

In some embodiments, after the termination of a service interruption at the CPS, the CPS may be configured to identify, using a CPS-table of records, the transaction identification numbers of all or substantially all electronic data records which were received after a predetermined point in time.

In certain embodiments, the CPS may be configured to transmit a request to the DRS for the identified electronic data records. The DRS may be further configured to transmit the requested electronic data records to the CPS.

The CPS may be yet further configured to check the transaction identification numbers of the received electronic data records from the DRS against the transaction identification numbers of the identified electronic data records, and identify the transaction identification numbers of electronic data records which were received by the CPS after the predetermined point in time, and failed to be transmitted to the DRS.

In some embodiments, the CPS may be further configured to request that the CS re-transmit any electronic data records which were received by the CPS after the predetermined amount of time and failed to be transmitted to the DR. In certain embodiments, the CPS may be further configured to request that the CS re-transmit any electronic data records which were associated with a batch of electronic data records which included data records that were received by the CPS after the predetermined amount of time and failed to be transmitted to the DR. In certain embodiments, the CS may be further configured to transmit all such requested electronic data records to the CPS.

In some embodiments, the CPS may be configured to determine the batch identification numbers associated with the transaction identification numbers of the identified electronic data records. The CPS may be further configured to transmit the batch identification numbers to the CS and may request the CS to transmit substantially all electronic data records comprising the transmitted batch identification numbers.

In response to the receipt of the requested electronic data records, the CPS may be further configured to identify substantially all electronic data records, from the received electronic data records, which were previously executed, and failed to be transmitted to the DRS. The CPS may be further configured to transmit the identified electronic data records to the DRS.

In response to the receipt of the requested electronic data records, the CPS may be further configured to identify substantially all electronic data records, from the requested electronic data records, which were not previously executed. The CPS may also be configured to execute the determined electronic records and transmit the identified electronic data records to the DRS.

The CPS, in response to the receipt of the requested electronic data records, may also be configured to identify substantially all electronic data records, from the selected electronic data records, which were previously executed, and failed to be transmitted to the DRS; and transmit the identified electronic data records to the DRS.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

Figure 1:
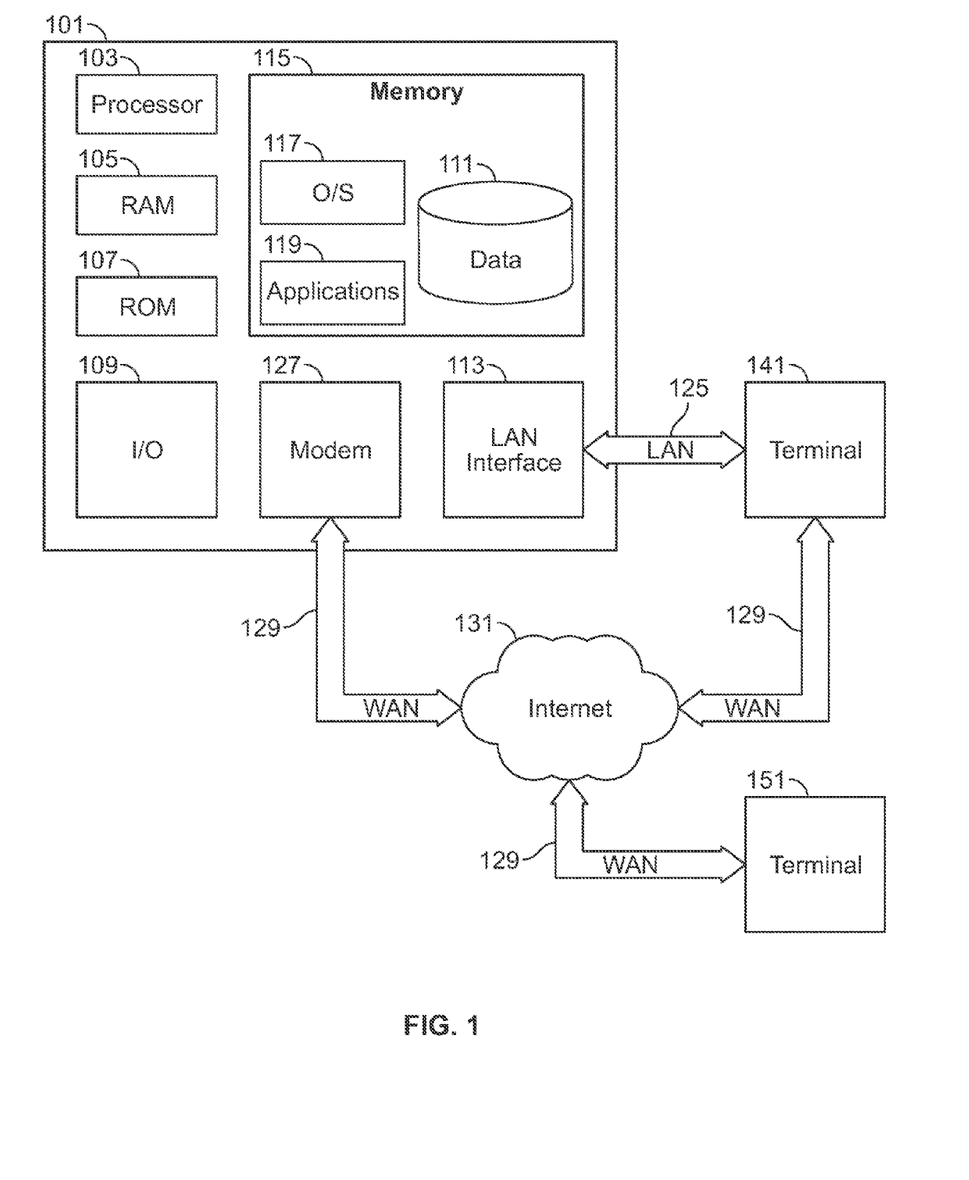
FIG. 1 shows an illustrative apparatus in accordance with principles of the invention.

FIG. 1 is an illustrative block diagram of mobile device system 100 based on a computer 101. The computer 101 may have a processor 103 for controlling the operation of the mobile device and its associated components, and may include RAM 105, ROM 107, input/output module 109, and a memory 115. The processor 103 will also execute all software running on the computer—e.g., the operating system. Other components commonly used for computers such as EEPROM or Flash memory or any other suitable components may also be part of the computer 101.

The memory 115 may be comprised of any suitable permanent storage technology—e.g., a hard drive. The memory 115 stores software including the operating system 117 any application(s) 119 along with any data 111 needed for the operation of the system 100. Alternatively, some or all of computer executable instructions may be embodied in hardware or firmware (not shown). The computer 101 executes the instructions embodied by the software to perform various functions.

Input/output ("I/O") module may include connectivity to a microphone, keyboard, touch screen, and/or stylus through which a user of computer 101 may provide input, and may also include one or more speakers for providing audio output and a video display device for providing textual, audiovisual and/or graphical output.

System 100 may be connected to other mobile device systems via a LAN interface 113.

System 100 may operate in a networked environment supporting connections to one or more remote computers, such as terminals 141 and 151. Terminals 141 and 151 may be personal computers or servers that include many or all of the elements described above relative to mobile device system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program(s) 119, which may be used by computer 101, may include computer executable instructions for invoking user functionality related to communication, such as email, Short Message Service (SMS), and voice input and speech recognition applications.

Computer 101 and/or terminals 141 or 151 may also be mobile devices including various other components, such as a battery, speaker, and antennas (not shown).

Terminal 151 and/or terminal 141 may be portable devices such as a laptop, cell phone, Blackberry™, or any other suitable device for storing, transmitting and/or transporting relevant information. Terminals 151 and/or terminal 141 may be other mobile devices. These mobile devices may be identical to mobile device system 100 or different. The differences may be related to hardware components and/or software components.

Figure 2:
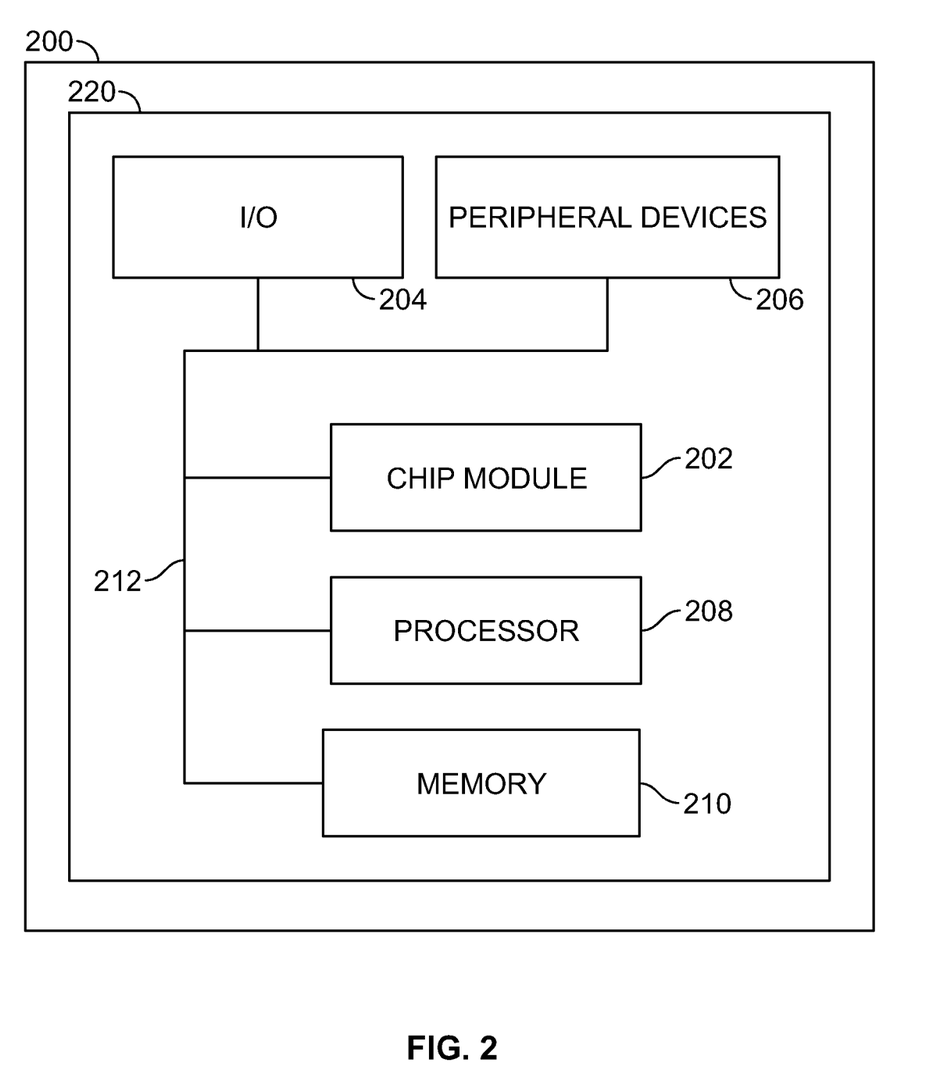
FIG. 2 shows an illustrative apparatus in accordance with the principles of the invention.

FIG. 2 shows illustrative apparatus 200. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute data structural information, structural parameters of the data, transaction identification numbers, batch identification numbers; and machine-readable memory 210.

Machine-readable memory 210 may be configured to store in machine-readable data structures: transaction identification numbers, batch identification numbers, the current time, information pertaining to account holders and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

The invention may be described in the general context of computer-executable instructions, such as program modules, being executed by a computer. Generally, program modules may include routines, programs, objects, components, data structures, etc., that perform particular tasks or store or process data structures, objects and other data types. The invention may also be practiced in distributed computing environments where tasks are performed by separate (local or remote) processing devices that are linked through a communications network.

In a distributed computing environment, program modules may be located in both local and remote computer storage media including memory storage devices. In a distributed computing environment, devices that perform the same or similar function may be viewed as being part of a "module" even if the devices are separate (whether local or remote) from each other.

Figure 3:
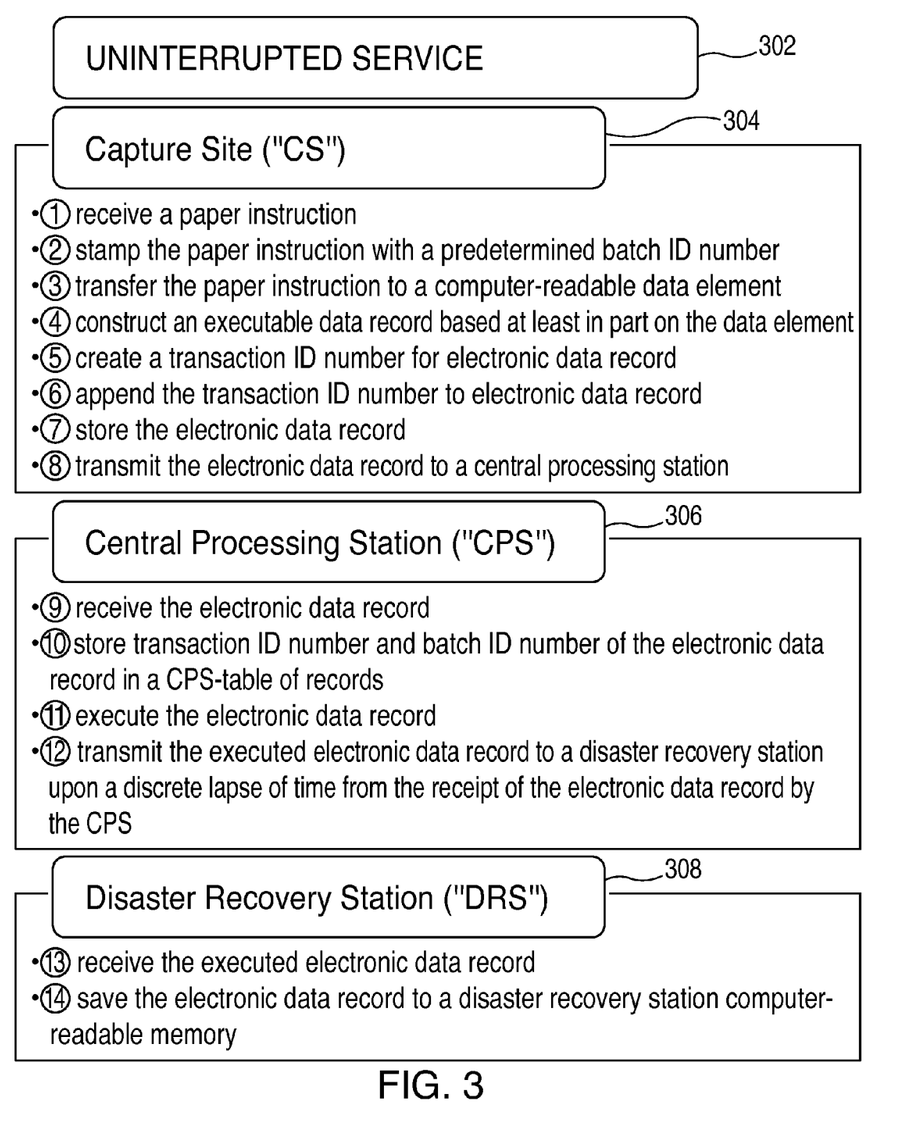
FIG. 3 shows an illustrative diagram in accordance with the principles of the invention.

FIG. 3 shows uninterrupted service 302 at capture site ("CS") 304, central processing station ("CPS") 306 and disaster recovery station ("DRS") 308. Capture Site 304 may perform step 1, which shows receiving a paper instruction. Capture Site may also stamp the paper instruction with a predetermined batch number, as shown at 304, in step 2. Capture Site 304 may transfer a paper instruction to a computer-readable data element, as shown in step 3. Capture Site may construct an executable data records based at least in part on the data element, as shown in step 4 of 304. Capture Site may create a transaction ID number for the electronic data record, as shown in step 5 of 304. Capture Site may append the transaction ID number to the electronic data record, as shown in step 6 of 304. Capture Site may also include step 7, which shows storing the electronic data record. Capture Site may transmit the electronic data record to a central processing station, as shown in step 8 of 304.

Central Processing station 306 may receive the electronic data record, as shown in step 9. Central Processing station may store a transaction ID number and batch ID number of the electronic data record, as shown in step 10 of 306. Central Processing station may execute the electronic data record, as shown in step 11 of 306. Central Processing station may transmit the executed electronic data record a disaster recovery station upon a discrete lapse of time from the receipt of the electronic data record by the CPS, as shown in step 12 of 306.

Disaster Recovery Station 308 may receive the executed electronic data record, as shown in step 13. Disaster Recovery Station may save the electronic data record to a DRS-computer readable memory, as shown in step 14 of 308.

Figure 4:
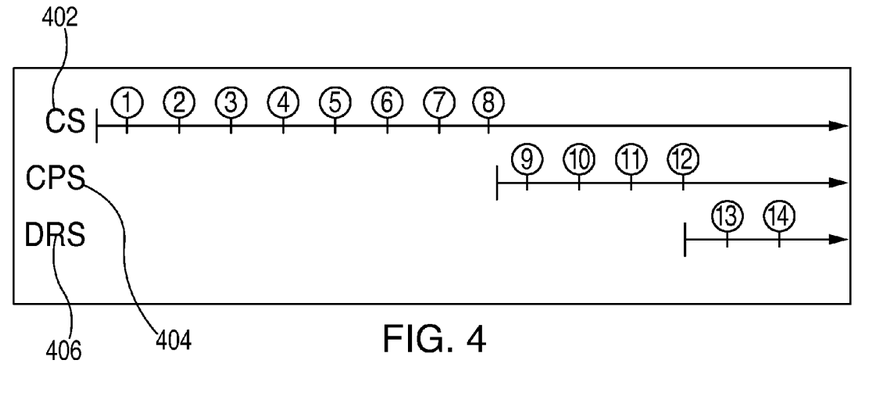
FIG. 4 shows an illustrative diagram in accordance with the principles of the invention.

FIG. 4 shows the steps described above in FIG. 3 in a sequential timeline. The steps are referenced by their respective numbers. Steps 1-8 may occur in CS 402. Steps 9-12 may occur in CPS 404. Steps 13-14 may occur in DRS 406. It should be appreciate that step 1-14 may be optional and may occur in a different order than the one shown in FIG. 4.

Figure 5:
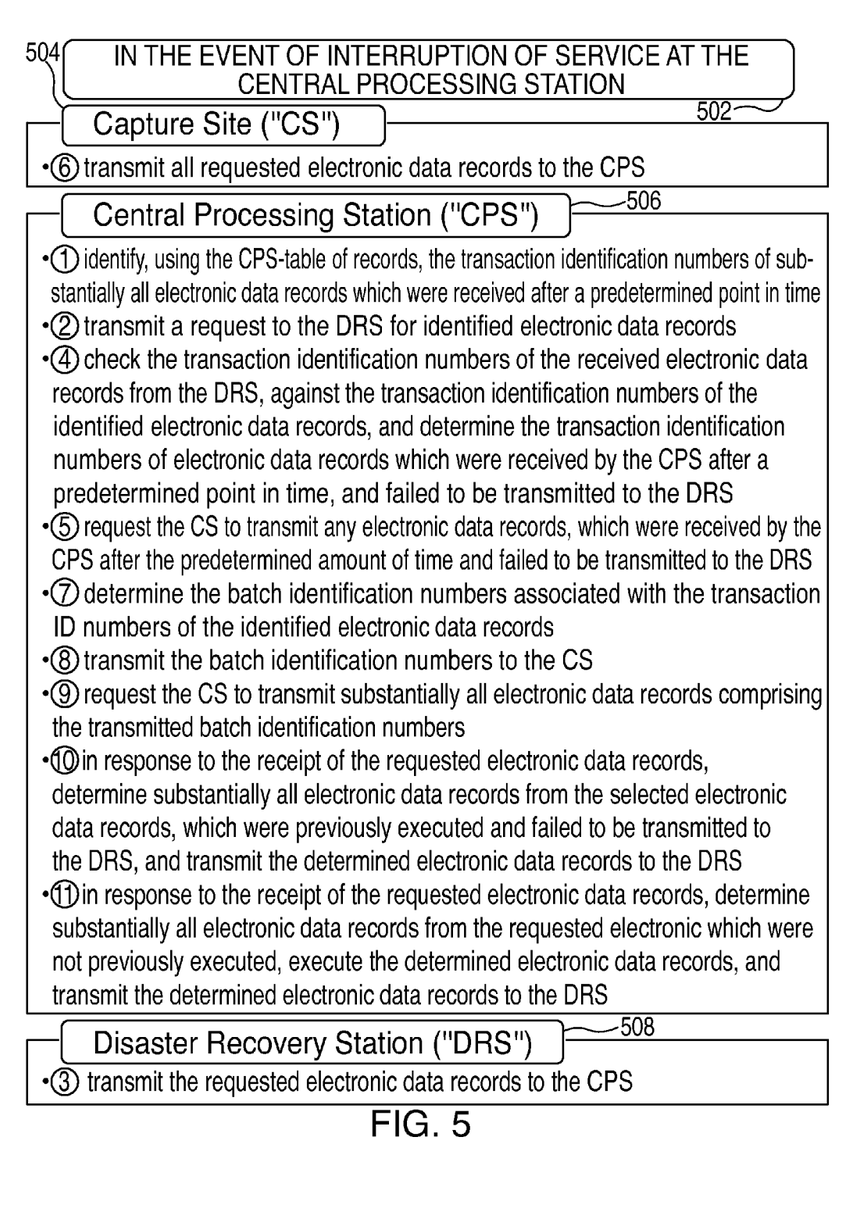
FIG. 5 shows an illustrative diagram in accordance with the principles of the invention.

FIG. 5 shows capture site 504, central processing station 506 and disaster recovery station 508 in the event of interruption of service at the central processing station. Central Processing Station 506 may identify, using the CPS-table of records, the transaction identification numbers of substantially all electronic data records which were received after a predetermined point in time, as shown in step 1. Central processing station may transmit a request to the DRS for identified electronic data records, as shown in step 2.

Disaster recovery station 508 may transmit the requested electronic data records to the CPS, as shown in step 3.

Central processing station 506 may check the transaction identification numbers of the received electronic data records from the DRS, against the transaction identification numbers of the identified electronic data records, and identify the transaction identification numbers of electronic data records which were received by the CPS after a predetermined point in time, and failed to be transmitted to the DRS, as shown in step 4. Central processing station may request the CS to transmit any electronic data records, which were received by the CPS after the predetermined amount of time and failed to be transmitted to the DRS, as shown in step 5.

Capture site may transmit all requested electronic data records to the CPS, as shown in step 6 of 504.

Central processing station 506 may identify the batch identification numbers associated with the transaction ID numbers of the identified electronic data records, as shown in step 7. Central processing station may transmit the batch identification numbers to the CS, as shown in step 8 of 506.

Central processing station may request the CS to transmit substantially all electronic data records comprising the transmitted batch identification numbers, as shown in step 9 of 506. Central processing station, in response to the receipt of the requested electronic data records, may identify substantially all electronic data records from the selected electronic data records, which were previously executed and failed to be transmitted to the DRS, and transmit the identified electronic data records to the DRS, as shown in step 10 of 506. Central processing station, in response to the receipt of the requested electronic data records, may identify substantially all electronic data records from the requested electronic which were not previously executed, execute the identified electronic data records, and transmit the identified electronic data records to the DRS, as shown in step 11 of 506.

Figure 6:
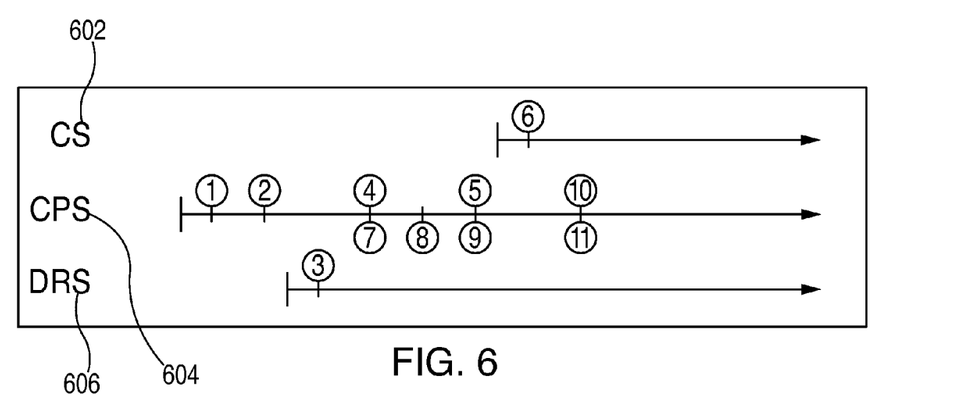
FIG. 6 shows an illustrative diagram in accordance with the principles of the invention.

FIG. 6 shows the steps described above in FIG. 5 in a sequential timeline. The steps are referenced by their respective numbers. Step 6 may occur in CS 602. Steps 1, 2, 4, 5, 7, 8, 9, 10 and 11 may occur in CPS 604. It should be appreciated that in some embodiments, steps 4 and 5 may occur without steps 7, 8 and 9. In some embodiments, steps 7, 8 and 9 may occur while steps 4 and 5 may not occur. In some embodiments, steps 4, 5, 7, 8 and 9 may all occur. It should be appreciated that in some embodiments, step 10 may occur independent of step 11. In some embodiments, step 11 may occur while step 10 may not occur. In some embodiments, steps 10 and 11 may both occur. Step 3 may occur in DRS 606.

Figure 7:
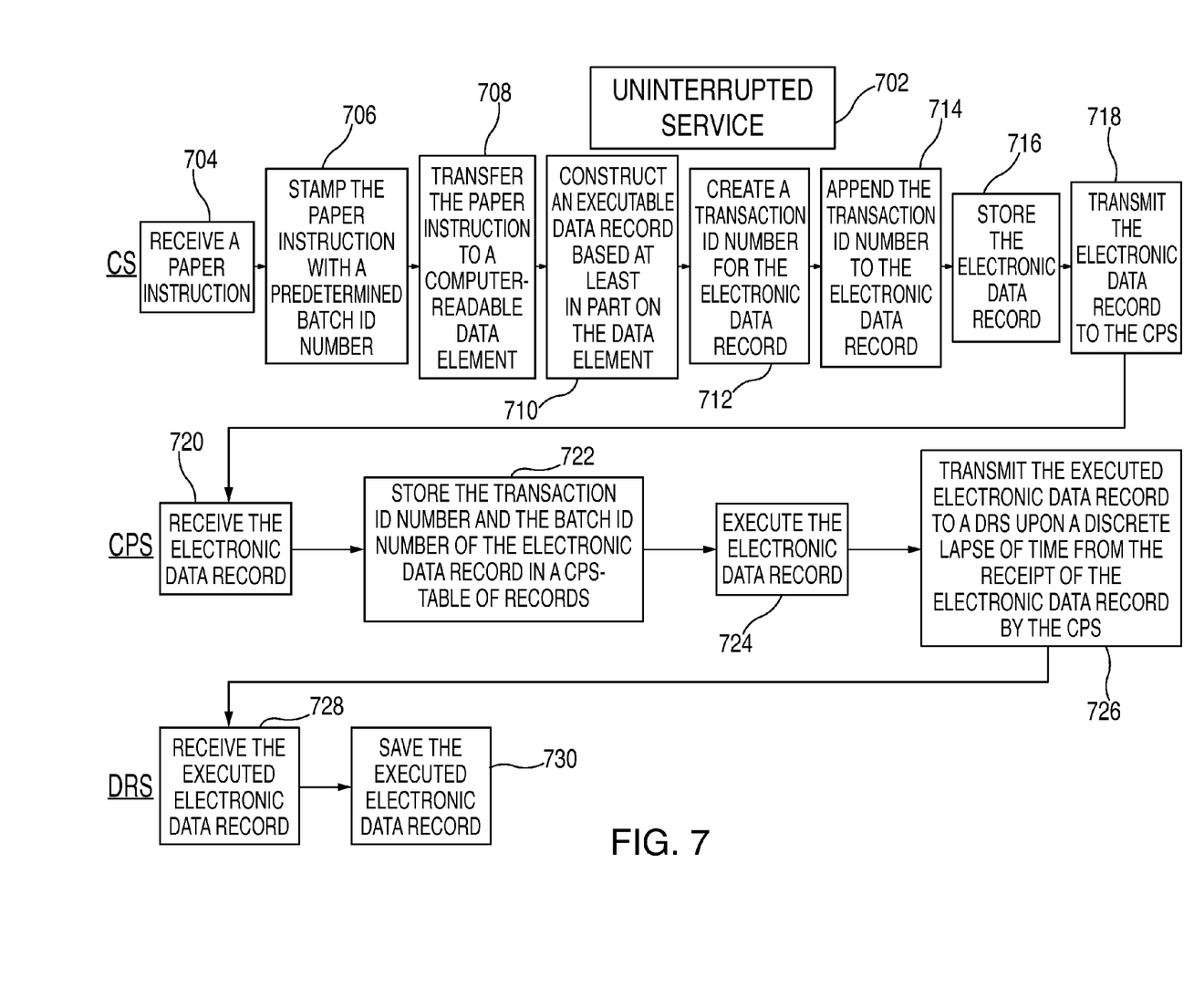
FIG. 7 shows an illustrative diagram in accordance with the principles of the invention.

FIG. 7 shows swim lines CS, CPS and DRS during uninterrupted service 702. The CS may receive a paper instruction, as shown in step 704. The CS may stamp the paper instruction with a predetermined batch identification number, as shown in step 706. The CS may transfer the paper instruction to a computer-readable data element, as shown in step 708. The CS may construct an executable data record based at least in part on the data element, as shown in step 710. The CS may create a transaction ID for the electronic data record, as shown in step 712. The CS may append the transaction ID to the electronic data record, as shown in step 714. The CS may transmit the electronic data record transmit the electronic data record to the CPS, as shown in step 718.

The CPS may receive the electronic data record, as shown in step 720. The CPS may store the transaction ID number and the batch number of the electronic data record in a CPS-table of records, as shown in step 722. The CPS may execute the electronic data record, as shown in step 724. The CPS may transmit the executed electronic data to a DRS upon a discrete lapse of time from the receipt of the electronic data record by the CPS, as shown in step 726.

The DRS may receive the executed electronic data record, as shown in step 728. The DRS may save the executed electronic data record, as shown in step 730.

Figures 8, 8A:
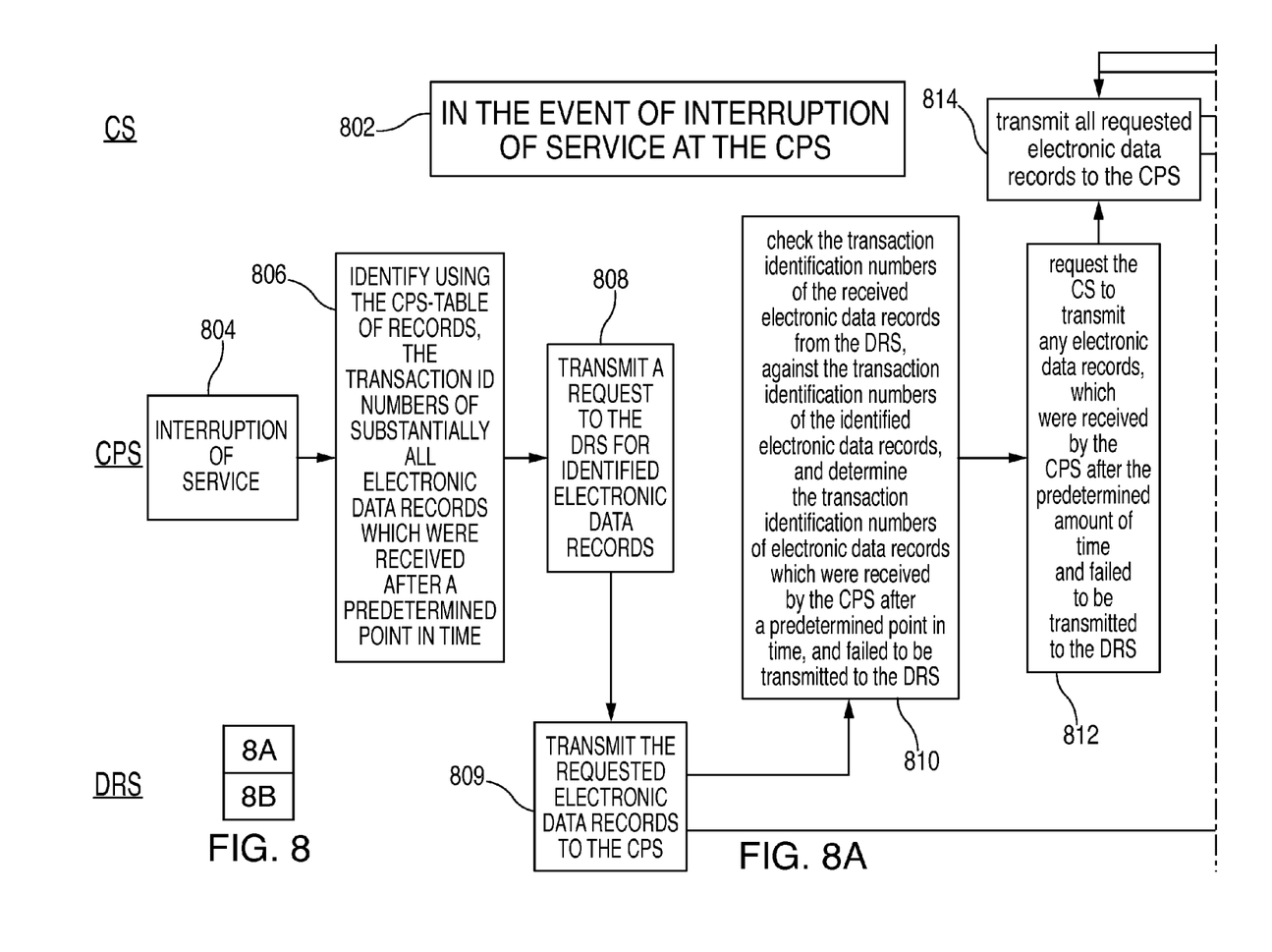
FIG. 8A and FIG. 8B show an illustrative diagram in accordance with the principles of the invention.
Figure 8B:
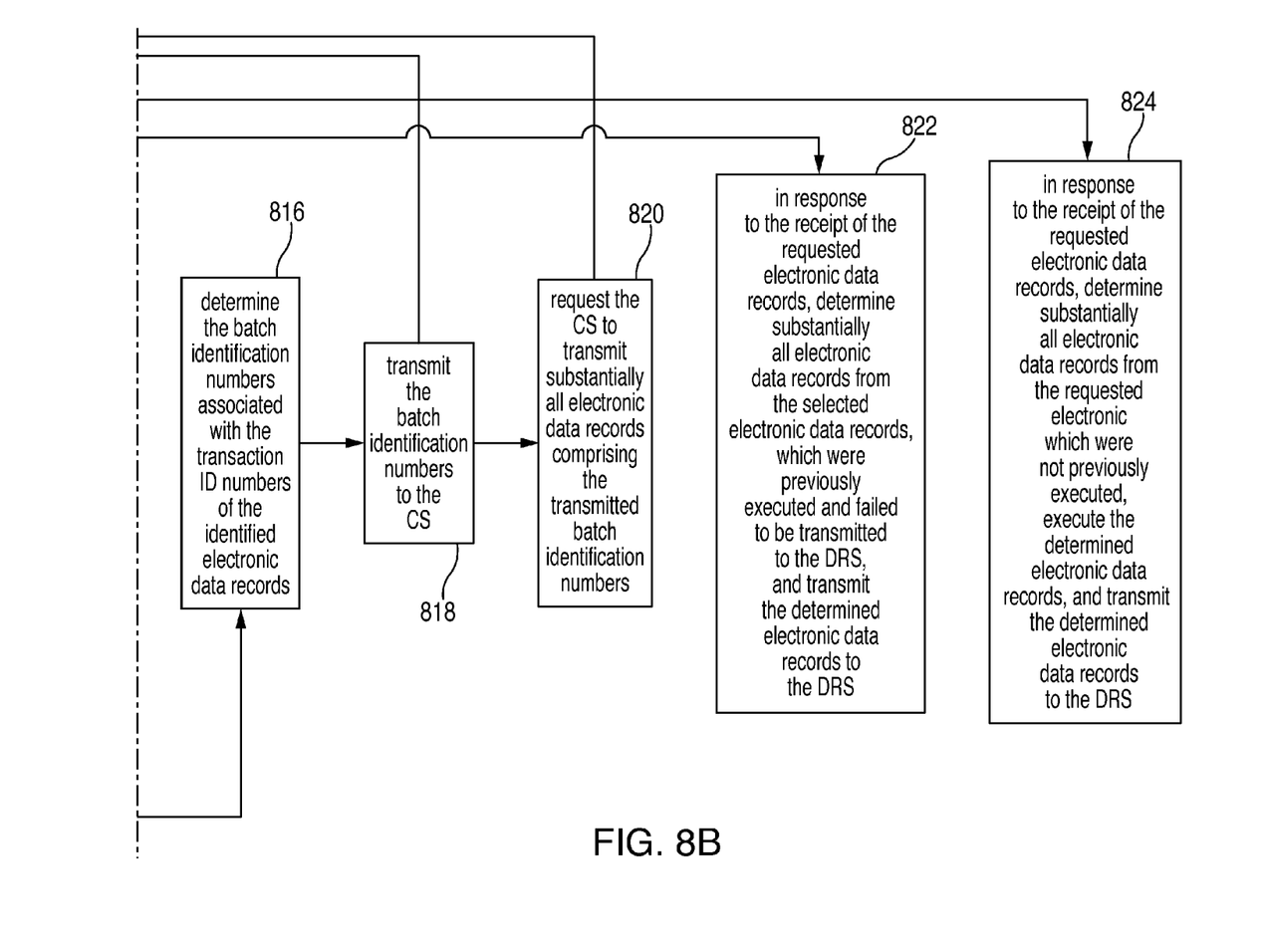

FIG. 8 shows swim lines CS, CPS and DRS in the event of interruption of service 802 at the CPS. Step 804 shows interruption of service at the CPS. The CPS may identify, using the CPS-table of records, the transaction ID numbers of substantially all electronic data records which were received after a predetermined point in time, as shown in step 806. Step 806 may occur when the interruption of service terminates. The CPS may transmit a request to the DRS for identified electronic data records, as shown in step 808.

The DRS may transmit the requested electronic data records to the CPS, as shown in step 809.

The CPS may check the transaction identification numbers of the received electronic data records from the DRS, against the transaction identification numbers of the identified electronic data records, and identify the transaction identification numbers of electronic data records which were received by the CPS after a predetermined point in time, and failed to be transmitted to the DRS, as shown in step 810. The CPS may request the CS to transmit any electronic data records which were received by the CPS after the predetermined amount of time and failed to be transmitted to the DRS, as shown in step 812.

The CS transmit all requested electronic data records to the CPS, as shown in step 814.

The CPS may determine the batch identification numbers associated with the transaction ID numbers of the identified electronic data records, as shown in step 810. It should be appreciated the step 810 may be preceded by step 809.

The CPS may transmit the batch identification numbers to the CS, as shown in 818. The CPS may request the CS to transmit substantially all electronic data records including the transmitted batch identification numbers, as shown in step 820. It should be appreciated that Step 814, which shows the CS transmit requested electronic data records to the CPS, may be preceded by 820.

The CPS, in response to the receipt of the requested electronic data records, may identify substantially all electronic data records from the requested electronic data records, which were previously executed and failed to be transmitted to the DRS, and transmit the identified electronic data records to the DRS, as shown in step 822. It should be appreciated that step 822 may be preceded by step 814.

The CPS, in response to the receipt of the electronic data records, may identify substantially all electronic data records from the requested electronic data records which were not previously executed, execute the identified electronic data records, and transmit the identified electronic data records to the DRS, as shown in step 824. It should be appreciated that step 824 may be preceded by step 814.

It should be appreciated that the steps described above may be optional, and may occur in the order described above, as well as any other reasonable order.

Thus, methods and apparatus for recovering data following a service interruption at a CPS are provided. Persons skilled in the art will appreciate that the present invention can be practiced by other than the described embodiments, which are presented for purposes of illustration rather than of limitation, and that the present invention is limited only by the claims that follow.

What is claimed is:

1. An apparatus for data processing comprising:
 a capture site ("CS") configured to:
  receive a paper instruction;
  stamp the paper instruction with a predetermined batch identification number;
  transfer the paper instruction to a computer-readable data element;
  construct an executable electronic data record based at least in part on the data element;
  create a transaction identification number for the electronic data record;
  append the transaction identification number to the electronic data record;
  store the electronic data record;
  transmit the electronic data record to a central processing station ("CPS");
 wherein the CPS is configured to:
  receive the electronic data record;
  store the transaction identification number and the batch identification number of the electronic data record in a CPS-table of records;
  execute the electronic data record;
  transmit the executed electronic data record to a disaster recovery station ("DRS") following a discrete lapse of time from the receipt of the electronic data record by the CPS;
 wherein the DRS is configured to:
  receive the executed electronic data record; and
  save the electronic data record to a DRS computer-readable memory; and
 wherein, following the termination of a service interruption at the CPS, the CPS is further configured to identify, using the CPS-table of records, the transaction identification numbers of substantially all electronic data records which were received after a predetermined point in time;
 wherein the transmission to the DRS does not occur in real time;
 wherein the CPS is configured to transmit a request to the DRS for the identified electronic data records;
 wherein the DRS is configured to transmit the requested electronic data records to the CPS;
 wherein the CPS is configured to check the transaction identification numbers of the received electronic data records from the DRS, against the transaction identification numbers of the identified electronic data records, and identify the transaction identification numbers of electronic data records which were received by the CPS after the predetermined point in time, and failed to be transmitted to the DRS.

2. The apparatus of claim 1, wherein the CPS is further configured to request the CS to transmit any electronic data records, which were received by the CPS after the predetermined amount of time and failed to be transmitted to the DRS.

3. The apparatus of claim 2, wherein the CS is further configured to transmit all requested electronic data records to the CPS.

4. The apparatus of claim 3, wherein the CPS is further configured to:
   determine the batch identification numbers associated with the transaction identification numbers of the identified electronic data records;
   transmit the batch identification numbers to the CS;
   request the CS to transmit substantially all electronic data records comprising the transmitted batch identification numbers.

5. The apparatus of claim 4, wherein the CS is configured to transmit the requested electronic data records to the CPS.

6. The apparatus of claim 5, wherein the CPS, in response to the receipt of the requested electronic data records, is configured to:
   identify substantially all electronic data records, from the selected electronic data records, which were previously executed, and failed to be transmitted to the DRS; and
   transmit the identified electronic data records to the DRS.

7. The apparatus of claim 5, wherein the CPS, in response to the receipt of the requested electronic data records, is configured to:
   identify substantially all electronic data records, from the requested electronic data records, which were not previously executed;
   execute the identified electronic records; and transmit the determined electronic data records to the DRS.

8. The apparatus of claim 3, wherein the CPS, in response to the receipt of the requested electronic data records, is configured to:
   identify substantially all electronic data records, from the selected electronic data records, which were previously executed, and failed to be transmitted to the DRS; and
   transmit the identified electronic data records to the DRS.

9. One or more non-transitory computer-readable media storing computer-executable instructions which, when executed by a processor on a computer system, perform a method for data processing comprising:
   receiving a paper instruction at a CS;
   stamping the paper instruction with a predetermined batch number at the CS;
   transferring the paper instruction to a computer-readable data element at the CS;
   constructing an executable electronic data record at the CS, said electronic data record based at least in part on the paper instruction and comprising the computer readable data element;
   creating a transaction identification number for the electronic data record;
   appending the transaction identification number to the electronic data record;
   storing the electronic data record to a computer readable memory at the CS;
   transmitting the electronic data record from the RS to a CPS;
   receiving the electronic data record at the CPS;
   storing the transaction identification number and the batch identification number of the electronic data record in a CPS-table of records;
   executing the electronic data record at the CPS;
   transmitting, not in real time, the executed electronic data record from the CPS to a DRS, upon a discrete lapse of time from the receipt of the electronic data record by the CPS;
   receiving the executed electronic data record at the DRS;
   saving the electronic data record to a computer-readable memory at the DRS; and
   wherein:
      following the termination of a service interruption at the CPS, the CPS is further configured to identify, using the CPS-table of records, the transaction identification numbers of substantially all electronic data records which were received after a predetermined point in time;
      the CPS is configured to transmit a request to the DRS for the identified electronic data records;
      the DRS is configured to transmit the requested electronic data records to the CPS;
      the CPS is configured to:
         check the transaction identification numbers of the received electronic data records from the DRS, against the transaction identification numbers of the identified electronic data records, and identify the transaction identification numbers of electronic data records which were received by the CPS after the predetermined point in time, and failed to be transmitted to the DRS;
         request the CS to transmit any electronic data records, which were received by the CPS after the predetermined amount of time and failed to be transmitted to the DRS;
      the CS is configured to:
         transmit all requested electronic data records to the CPS.

10. The method of claim 9, wherein:
the CPS is further configured to:
   identify the batch identification numbers associated with the transaction identification numbers of the identified electronic data records;
   transmit the batch identification numbers to the CS;
   request the CS to transmit substantially all electronic data records comprising the transmitted batch identification numbers.
the CS is configured to:
   transmit the requested electronic data records to the CPS.

11. The method of claim 10, wherein the CPS, in response to the receipt of the requested electronic data records, is configured to:
   identify substantially all electronic data records, from the selected electronic data records, which were previously executed, and failed to be transmitted to the DRS; and
   transmit the identified electronic data records to the DRS.

12. The method of claim 11, wherein the CPS, in response to the receipt of the requested electronic data records, is configured to:
   identify substantially all electronic data records, from the requested electronic data records, which were not previously executed;
   execute the identified electronic records; and
   transmit the identified electronic data records to the DRS.

13. The method of claim 11, wherein the CPS, in response to the receipt of the requested electronic data records, is configured to:
  identify substantially all electronic data records, from the selected electronic data records, which were previously executed, and failed to be transmitted to the DRS; and
  transmit the identified electronic data records to the DRS.

* * * * *